US011036588B2

(12) United States Patent
Kottapalli et al.

(10) Patent No.: US 11,036,588 B2
(45) Date of Patent: Jun. 15, 2021

(54) REDUNDANCY BETWEEN PHYSICAL AND VIRTUAL ENTITIES IN HYPER-CONVERGED INFRASTRUCTURES

(71) Applicant: VMWARE, INC., Palo Alto, CA (US)

(72) Inventors: Ravi Kumar Reddy Kottapalli, Bangalore (IN); Srinivas Sampatkumar Hemige, Bangalore (IN); Shivaprasad Adampalli Venkateshappa, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 63 days.

(21) Appl. No.: 16/689,117

(22) Filed: Nov. 20, 2019

(65) Prior Publication Data

US 2021/0089402 A1 Mar. 25, 2021

(30) Foreign Application Priority Data

Sep. 25, 2019 (IN) .............................. 201941038643

(51) Int. Cl.
*G06F 11/07* (2006.01)
*G06F 11/14* (2006.01)
*G06F 11/30* (2006.01)
*G06F 11/10* (2006.01)

(52) U.S. Cl.
CPC ...... *G06F 11/1435* (2013.01); *G06F 11/1092* (2013.01); *G06F 11/1484* (2013.01); *G06F 11/301* (2013.01); *G06F 11/3006* (2013.01)

(58) Field of Classification Search
CPC ............. G06F 11/1484; G06F 11/2023; G06F 11/2033; G06F 11/2056; G06F 11/2097; G06F 11/3006; G06F 11/301
USPC .......................................... 714/4.11, 6.3, 13
See application file for complete search history.

(56) References Cited

U.S. PATENT DOCUMENTS

| 2006/0155912 | A1* | 7/2006 | Singh ................. G06F 11/2028 711/6 |
| 2014/0213177 | A1* | 7/2014 | Terwilliger ........... H04W 24/04 455/41.1 |
| 2016/0103698 | A1* | 4/2016 | Yang .................... G06F 11/203 714/4.11 |
| 2016/0342437 | A1* | 11/2016 | Khemani ............ H04L 43/0811 |
| 2017/0357533 | A1* | 12/2017 | Chaganti ............... G06F 9/5011 |

\* cited by examiner

*Primary Examiner* — Chae M Ko

(57) ABSTRACT

Techniques for providing redundancy between physical and virtual entities in a hyper-converged infrastructure are disclosed. In one example, a management node may include a physical to virtual redundancy module to identify a physical entity with configuration data in a hyper-converged infrastructure as a primary entity, determine an equivalent virtual entity corresponding to the physical entity, and deploy the equivalent virtual entity in a compute node of the hyper-converged infrastructure. Further, the physical to virtual redundancy module may apply the configuration data associated with the physical entity to the deployed equivalent virtual entity and designate the equivalent virtual entity as a fail-over entity to provide redundancy in an event of failure of the physical entity.

26 Claims, 7 Drawing Sheets

| PHYSICAL ENTITY ID 202 | TYPE 204 | SOFTWARE VERSION 206 | CONFIGURATION DATA 208 | EQUIVALENT VIRTUAL ENTITY 210 | TYPE 212 | SOURCE 214 | HA 216 |
|---|---|---|---|---|---|---|---|
| XX.XX | ROUTER | 15.4 | AAA | YES | OVF ISO | XX.XX.XX | YES |
| YY.YY | SD-WAN | 17.7 | BBB | YES | OVF | AA.AA.AA | YES |
| ZZ.ZZ.ZZ | ARISTA ROUTER | 12.2 | CCC | NO | NO | NO | NO |

REDUNDANCY BETWEEN PHYSICAL AND VIRTUAL ENTITIES IN HYPER-CONVERGED INFRASTRUCTURES

RELATED APPLICATIONS

Benefit is claimed under 35 U.S.C. 119(a)-(d) to Foreign Application Serial No. 201941038643 filed in India entitled "REDUNDANCY BETWEEN PHYSICAL AND VIRTUAL ENTITIES IN HYPER-CONVERGED INFRASTRUCTURES", on Sep. 25, 2019, by VMWARE, INC., which is herein incorporated in its entirety by reference for all purposes.

TECHNICAL FIELD

The present disclosure relates to computing environments, and more particularly to methods, techniques, and systems for providing redundancy between physical and virtual entities in a hyper-converged infrastructure.

BACKGROUND

In software defined data centers (SDDCs) with hyper-converged infrastructure, networking, storage, processing, and security may be virtualized and delivered as a service (e.g., referred to as "Infrastructure as a Service"). The term "hyperconverged infrastructure" may refer to a rack-based system that combines compute, storage, and networking components into a single system to reduce data center complexity and increase scalability. In such SDDCs, the deployment, provisioning, configuration, and operation of the entire network infrastructure may be abstracted from hardware and implemented using software. Further, the SDDC may include multiple clusters of physical servers and each cluster may execute SDDC components. For example, the SDDC components may include monitoring and management applications/services corresponding to network virtualization, server virtualization, storage virtualization, and the like. Further, such components may rely on data replication and synchronization to maintain continuous system availability (also referred as high availability).

BRIEF DESCRIPTION OF THE DRAWINGS

FIG. 2 shows an example physical to virtual redundancy table corresponding to a compute node in a hyper-converged infrastructure;

Figure 1A:
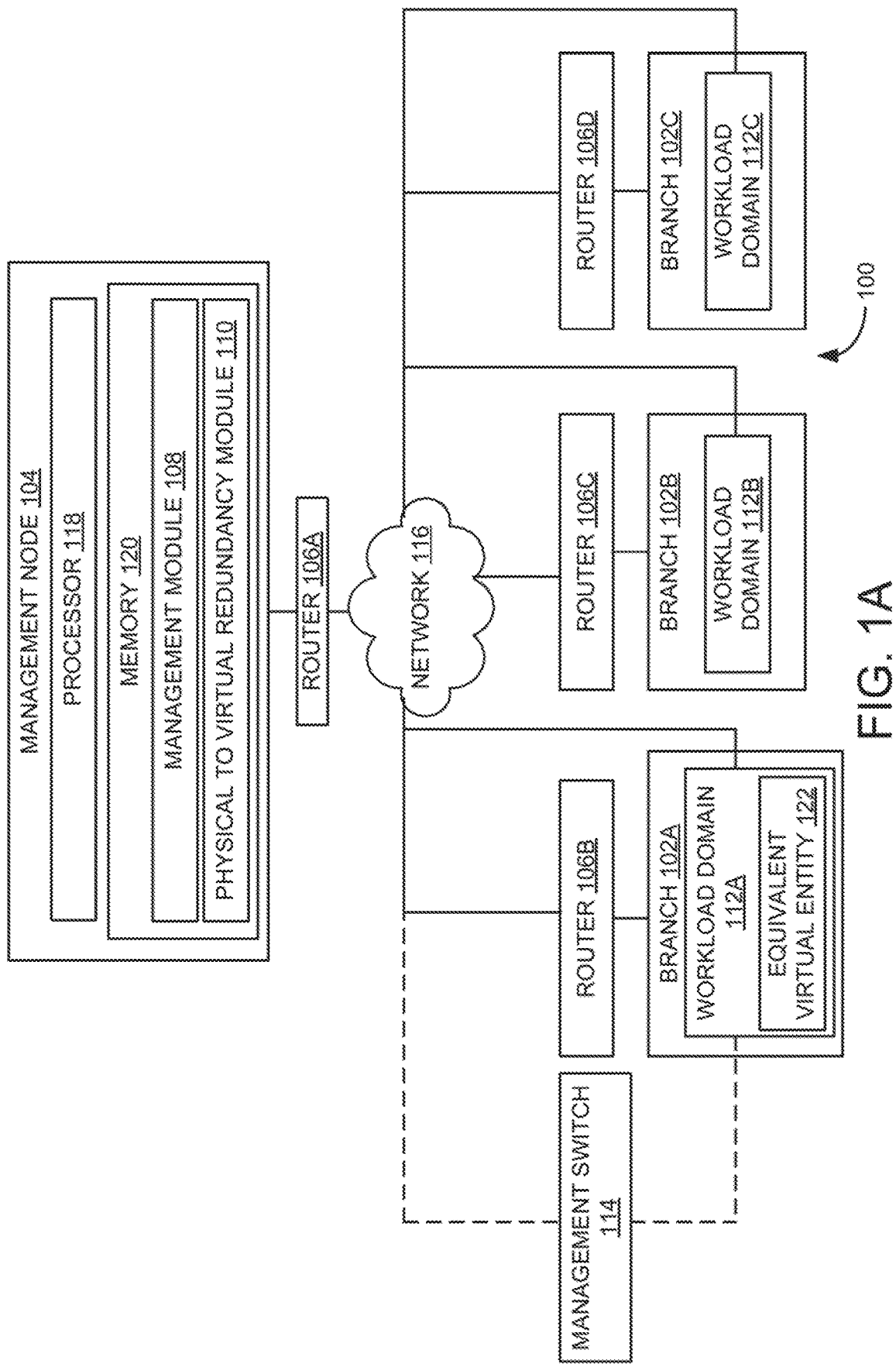
FIG. 1A is a block diagram of an example system illustrating a physical to virtual redundancy module to provide redundancy between physical and virtual entities.

The drawings described herein are for illustration purposes only and are not intended to limit the scope of the present subject matter in any way.

DETAILED DESCRIPTION

Examples described herein may provide an enhanced computer-based and network-based method, technique, and system for providing redundancy between physical and virtual entities in software defined data centers (SDDCs) with hyper-converged infrastructure. An SDDC may include multiple clusters of physical servers and each cluster may be a policy-based resource container with specific availability and performance attributes that combines compute (e.g., vSphere of VMware®), storage (vSAN of VMware®), and networking (e.g., NSX of VMware®) into a single consumable entity via different applications. For example, each cluster may correspond to one workload domain of the SDDC. The workload domain may be deployed in a virtual server rack, which may include the cluster of physical components or physical servers located across a plurality of physical racks. In another example, the workload domain may be deployed in a single physical rack. Further, the hyper-converged infrastructure may combine a virtualization platform such as a hypervisor, virtualized software-defined storage, and virtualized networking in an SDDC deployment.

Further, the workload domains may rely on data replication and synchronization to maintain continuous system availability, which may be referred as high availability. However, the hyper-converged infrastructure may include physical entities (e.g., network devices such as routers, software-defined wide area network (SD-WAN) components, and the like), which may be deployed as single elements without high availability. For example, some branch offices may not be able to offer redundancy of such physical entities because of constraints such as cost, maintenance, and the like. Thus, small and medium scale deployments may include single point of failures when the physical entity (e.g., without high availability) fails in the hyper-converged infrastructure.

Some examples may provide a redundancy between physical entities and between virtual entities in the hyper-converged infrastructure. However, there may be deployments with the combination of the virtual and physical entities in the hyper-converged infrastructure. Thus, providing redundancy between the virtual and physical entities may be challenging to avoid single point of failures.

Examples described herein may provide redundancy between physical and virtual entities in a hyper-converged infrastructure. Examples described herein may provide a physical to virtual redundancy module in a management node of the hyper-converged infrastructure. In one example, the physical to virtual redundancy module may identify a physical entity with configuration data in the hyper-converged infrastructure as a primary entity, determine an equivalent virtual entity corresponding to the physical entity, and deploy the equivalent virtual entity in a compute node of the hyper-converged infrastructure. Further, the physical to virtual redundancy module may apply the configuration data associated with the physical entity to the deployed equivalent virtual entity and designate the equivalent virtual entity as a fail-over entity to provide redundancy in an event of failure of the physical entity.

Thus, examples described herein may provide robust and flexible mechanism to offer redundancy between the physical to virtual entities in the hyper-converged infrastructure to avoid single point of failures. Further, examples described herein may provide redundancy in small to medium scale deployments without additional hardware component being installed.

System Overview and Examples of Operation

FIG. 1A is a block diagram of an example system 100 illustrating a physical to virtual redundancy module 110 to provide redundancy between physical and virtual entities. Example system 100 may represent a SDDC with hyper-converged infrastructure. The SDDC may be a data storage facility in which infrastructure elements such as networking, storage, central processing unit (CPU), security and the like can be virtualized and delivered as a service in cloud computing environments. Cloud computing may be based on the deployment of physical resources across a network, virtualizing the physical resources into virtual resources, and provisioning the virtual resources in SDDCs for use across cloud computing services and applications. Further, SDDCs can be implemented using a hyperconverged infrastructure. Hyperconverged infrastructure may combine a virtualization platform such as a hypervisor, virtualized software-defined storage, and virtualized networking in an SDDC deployment. An example platform to deploy and manage the SDDCs may include VMware Cloud Foundation™ (VCF), which is commercially available from VMware.

Example system 100 may include remote office and branch office (ROBO) architecture having a central office (e.g., management node 104) and multiple branch offices 102A to 102C. Example management node 104 may execute a centralized management application to centrally manage branch offices 102A to 102C. In some examples, management node 104 and branch offices 102A to 102C may be distributed across multiple sites (e.g., separate geographical locations). Further, management node 104 may be implemented in a computing device, either virtual or physical, and is communicatively coupled to branch offices 102A-102C via a network 116 (e.g., Wi-Fi, WiMAX, local area network (LAN), wide area network (WAN), metropolitan area network, Internet network, fixed wireless network, a wireless LAN, wireless WAN, personal area network (PAN), virtual private network (VPN), intranet, SD-WAN, or the like).

Further, branch offices 102A to 102C may include respective workload domains 112A to 112C. For example, each workload domain (e.g., 112A to 112C) may include a set of servers that are managed by management node 104. For example, each workload domain may be a policy-based resource container with specific availability and performance attributes that combines compute, storage, and networking into a single consumable entity via different applications. Furthermore, system 100 may include multiple physical entities. In one example, a physical entity may refer to any entity that is available as a physical component as well as a virtual component. For example, the physical entities may be network devices to manage network traffic to the Internet and vice-versa. Example physical entity may be a router (e.g., router 106A, 106B, 106C, or 106D) as shown in FIG. 1A), a software-defined wide area network (SD-WAN) component, a firewall device, a network address translator, or the like. In the example shown in FIG. 1A, physical entity (e.g., router 106B) may be implemented as part of a branch office 102A of the hyper-converged infrastructure to route network traffic of branch office 102A to the Internet and vice-versa.

As shown in FIG. 1A, management node 104 may include a management module 108 and a physical to virtual redundancy module 110. In one example, management node 104 may include a processor 118 and a memory 120 coupled to processor 118. Memory 120 may include management module 108 and physical to virtual redundancy module 110 to provide redundancy between the physical and virtual entities. In some examples, management module 108 and physical to virtual redundancy module 110 can be implemented as a single component.

During operation, management module 108 may communicate with physical to virtual redundancy module 110 when a physical to virtual redundancy is required for any physical entity corresponding to branch offices 102A to 102C. In one example, the redundancy can be provided to a physical entity for which an equivalent software version (i.e., an equivalent software entity or an equivalent virtual entity) is available. Further, physical to virtual redundancy module 110 may receive such requests from management module 108 to provide specific physical to virtual redundancy. Upon receiving such a request, physical to virtual redundancy module 110 may track the physical entities (i.e., single physical networking components) corresponding to a branch office (e.g., branch office 102A).

For example, physical to virtual redundancy module 110 may identify router 106B (e.g., herein after referred to as physical entity 106B) upon receiving a request to create physical to virtual redundancy for physical entity 106B. In one example, physical to virtual redundancy module 110 may identify physical entity 106B with configuration data as a primary entity. Further, physical to virtual redundancy module 110 may determine an equivalent virtual entity 122 corresponding to physical entity 106B. Furthermore, physical to virtual redundancy module 110 may deploy equivalent virtual entity 122 in a compute node associated with workload domain 112A. Example compute node may be a virtual machine, a physical server, and the like. Also, physical to virtual redundancy module 110 may apply the configuration data associated with physical entity 106B to deployed equivalent virtual entity 122. In one example, physical entity router 106B and the compute node may be implemented as part of workload domain 112A of branch office 102A of the hyper-converged infrastructure. In addition, physical to virtual redundancy module 110 may designate equivalent virtual entity 122 as a fail-over entity to provide redundancy in an event of failure of physical entity 106B. In this example, physical entity 106B may act as an active entity while equivalent virtual entity 122 may act as a standby entity.

Further during operation, physical to virtual redundancy module 110 may detect a failure of physical entity 106B. In one example, the failure of physical entity 106B may be detected by running a probing mechanism at defined intervals. Upon detecting the failure of physical entity 106B, physical to virtual redundancy module 110 may designate equivalent virtual entity 122 as the primary entity and apply the network bring up configurations to equivalent virtual entity 122 to perform functions of physical entity 106B. In this example, equivalent virtual entity 122 may become active.

Further during operation, physical to virtual redundancy module 110 may detect that physical entity 106B is back from the failure by regularly probing for status of physical entity 106B. When physical entity 106B is back from the failure, physical to virtual redundancy module 110 may designate equivalent virtual entity 122 as the fail-over entity via isolating equivalent virtual entity 122 from network 116 and designate physical entity 106B as the primary entity. In this example, physical to virtual redundancy module 110 may track a change in the configuration data associated with equivalent virtual entity 122 while equivalent virtual entity 122 is acting as the primary entity. Further, physical to virtual redundancy module 110 may apply the change in the configuration data to physical entity 106B that is designated as the primary entity when physical entity 106B is back from the failure.

Further as shown in FIG. 1A, system 100 may include a management switch 114 connected to network 116. In one example, management switch 114 may facilitate the imaging of the compute nodes in workload domains 112A to 112C, copy required images to a local datastore, and manage the compute nodes and the physical entities of branch offices 102A to 102C. In this example, physical to virtual redundancy module 110 may perform synchronization of the configuration data, apply network connectivity configurations for equivalent virtual entity 122, and/or image of the compute node (e.g., the physical server) via an out of band (OOB) management network via management switch 114. An example for providing redundancy between physical and virtual entities using a physical to virtual redundancy table is explained in FIG. 1B.

Figure 1B:
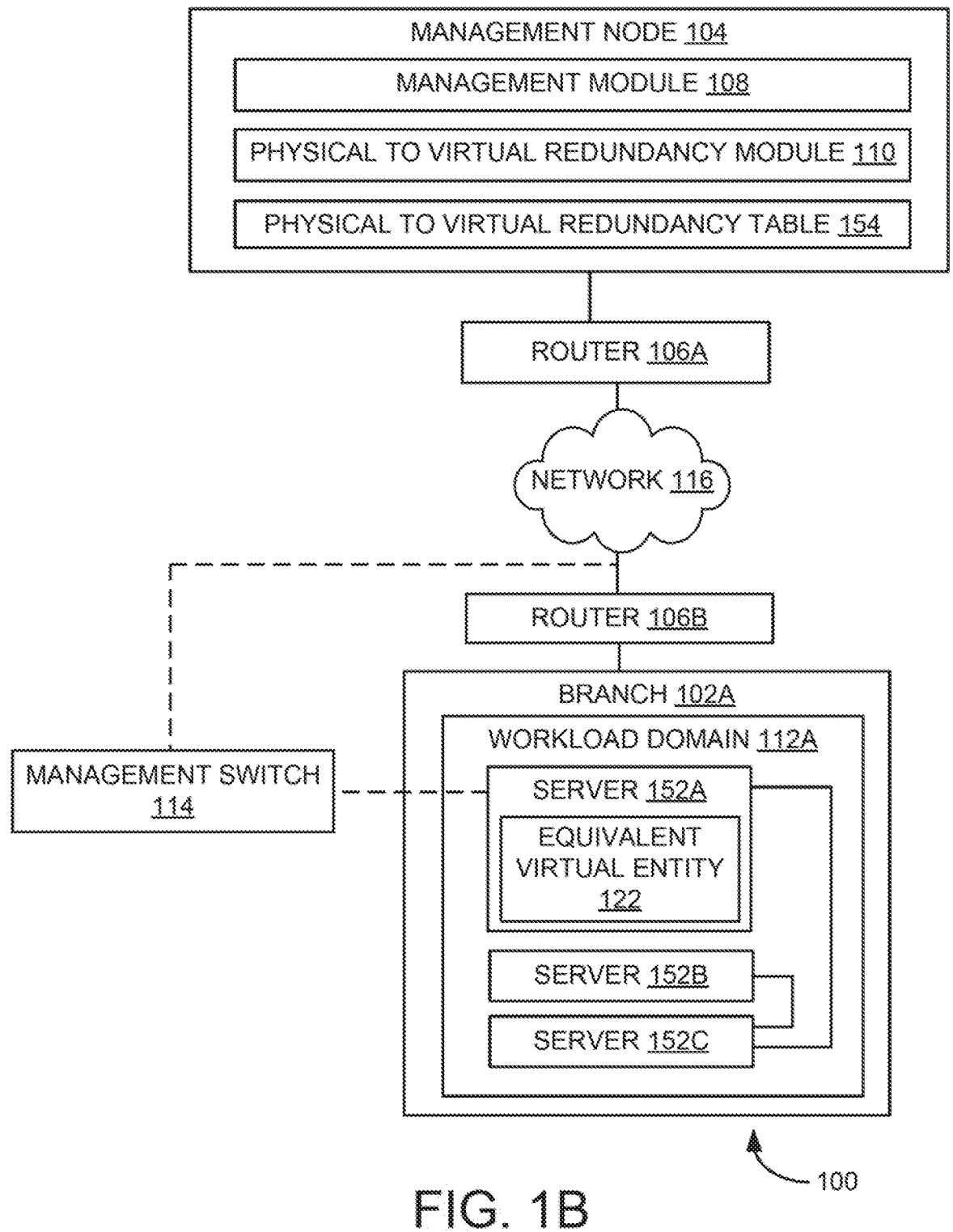
FIG. 1B is the block diagram of the example system of FIG. 1A, depicting an example physical to virtual redundancy table to provide redundancy between the physical entity and the equivalent virtual entity.

FIG. 1B is the block diagram of the example system 100 of FIG. 1A, depicting an example physical to virtual redundancy table 154 to provide redundancy between physical entity 106B and equivalent virtual entity 122. For example, similarly named elements of FIG. 1B may be similar in structure and/or function to elements described with respect to FIG. 1A. As shown in FIG. 1B, workload domain 112A may include multiple servers 152A to 152C with software-defined networking (SDN). As explained in FIG. 1A, equivalent virtual entity 122 may be deployed on server 152A or on a virtual machine running on server 152A.

Figure 3:
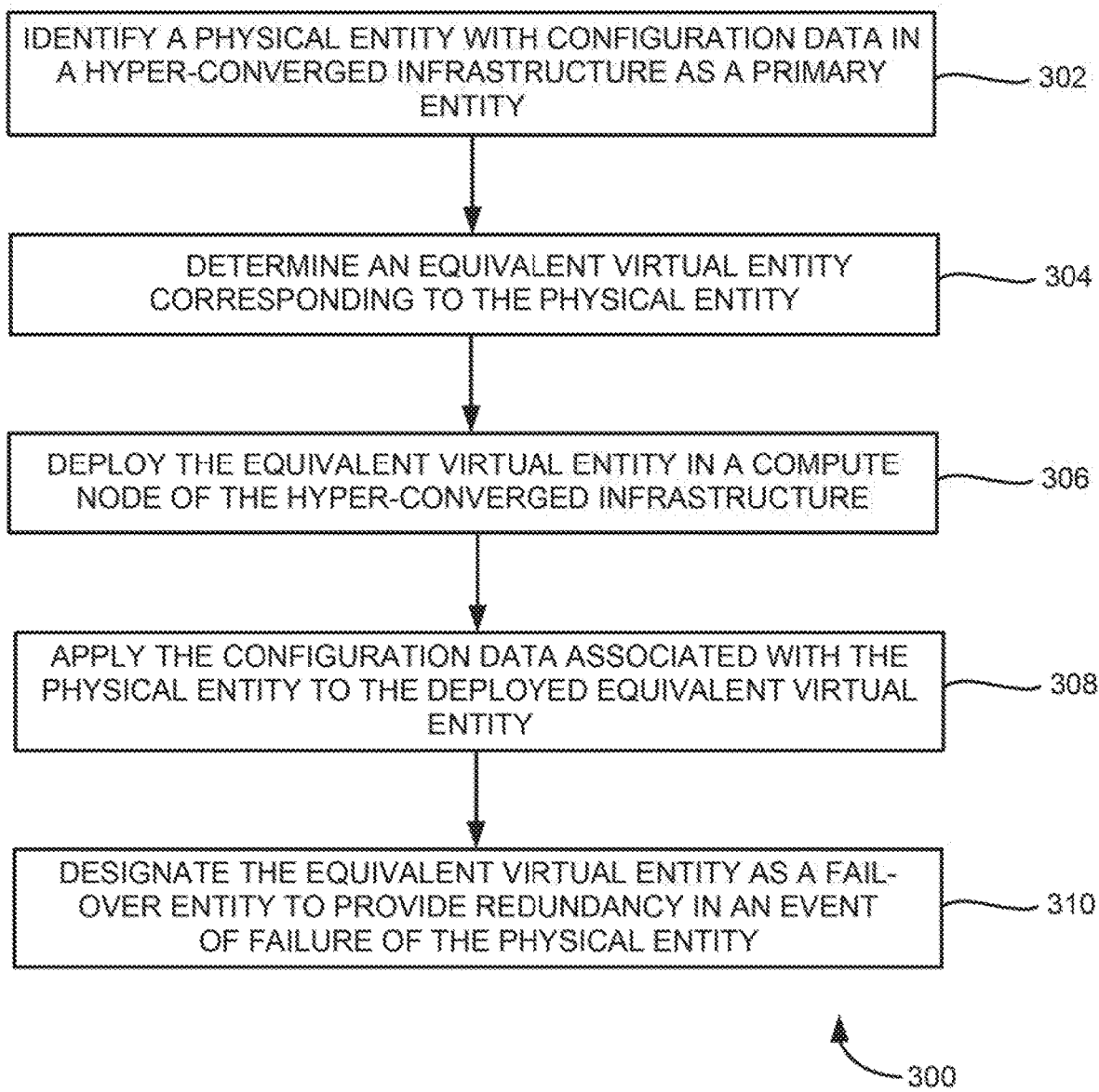
FIG. 3 is an example flow diagram illustrating providing redundancy between physical and virtual entities in a hyper-converged infrastructure.

Initially, management module 108 may monitor branch office 102A to track the physical entities (e.g., router 106B) along with associated metadata and also poll the corresponding configuration data. Further, management module 108 may handover the metadata and the configuration data to physical to virtual redundancy module 110 to populate or build physical to virtual redundancy table 154 with the metadata and the configuration data. Example physical to virtual redundancy table 154 is depicted in FIG. 3.

During operation, physical to virtual redundancy module 110 may communicate to one of servers (e.g., server 152A) and deploy equivalent virtual entity 122 of physical entity 106B on server 152A using physical to virtual redundancy table 154. In one example, physical to virtual redundancy module 110 may apply the configuration data associated with the physical entity to deployed equivalent virtual entity 122 using the physical to virtual redundancy table 154. In this example, equivalent virtual entity 122 may be in passive mode and physical entity 106B may be in active mode.

Further, physical to virtual redundancy module 110 may monitor the physical entity 106B to detect a failure of physical entity 106B. Upon detecting the failure, equivalent virtual entity 122 may become active and carry over the corresponding functions of physical entity 106B (e.g., routing traffic to the Internet and vice-versa).

In one example, physical to virtual redundancy module 110 may track a change in the configuration data associated with equivalent virtual entity 122 when equivalent virtual entity 122 is active or configured as the primary entity. Further, physical to virtual redundancy module 110 may update physical to virtual redundancy table 154 to reflect the change in the configuration data associated with equivalent virtual entity 122. Further in operation, physical to virtual redundancy module 110 may apply the change in the configuration data to physical entity 106B using the physical to virtual redundancy module 110 when physical entity 106B is back from the failure and becomes active.

For example, when virtual entity 122 is active, if a user adds or modifies the configuration data of equivalent virtual entity 122, a trigger may be generated to notify physical to virtual redundancy module 110 regarding the change in the configuration data via management module 108. Upon receiving the notification, physical to virtual redundancy module 110 may update physical to virtual redundancy table 154 to reflect the change in the configuration data. Furthermore, when physical entity 106B becomes active, virtual redundancy module 110 may make equivalent virtual entity 122 and apply delta configuration changes to physical entity 106B using physical to virtual redundancy table 154.

Thus, physical to virtual redundancy module 110 may track a change in the configuration data associated with the physical entity or equivalent virtual entity 122 that is designated as the primary entity, and update physical to virtual redundancy table 154 to reflect the change in the configuration data. Further, physical to virtual redundancy module 110 may maintain physical to virtual redundancy table 154 such that the configuration data of the physical entity 106B and equivalent virtual entity 122 may be identical. Also, networking connectivity configurations of equivalent virtual component 122 to the outside world can be taken care by physical to virtual redundancy module 110. Also, physical to virtual redundancy module 110 may maintain synchronization of the configuration data, apply network connectivity configurations for virtual entity 122, image of the servers via OOB management network corresponding to management switch 114.

In some examples, the functionalities described in FIGS. 1A and 1B, in relation to instructions to implement functions of management module 108, physical to virtual redundancy module 110, and any additional instructions described herein in relation to the storage medium, may be implemented as engines or modules including any combination of hardware and programming to implement the functionalities of the modules or engines described herein. The functions of management module 108 and physical to virtual redundancy module 110 may also be implemented by a respective processor. In examples described herein, the processor may include, for example, one processor or multiple processors included in a single device or distributed across multiple devices. In one example, management module 108 and physical to virtual redundancy module 110 may be a software entity residing in a central management station such as management node 104, a software-defined datacenter (SDDC) manager, a next generation VMware cloud foundation (VCF) central management orchestrator, or the like.

FIG. 2 shows an example physical to virtual redundancy table (e.g., physical to virtual redundancy table 154 of FIG. 1B) corresponding to a branch office 102A of FIGS. 1A and 1B in a hyper-converged infrastructure. In one example, physical to virtual redundancy table 154 may be build corresponding to branch office 102A and may include metadata and configuration data associated with the physical entities (i.e., single node physical entities) associated with branch office 102A. Example physical to virtual redundancy table 154 may include different columns such as a physical entity identifier 202, a type of a physical entity 204, a software version 206, configuration data 208, an availability of equivalent virtual entity 210, a type of virtual entity 212, a source of the virtual entity 214, and a status of high availability 216.

Physical entity identifier 202 may depict identifiers of the physical entities associated with branch office 102A. Type of a physical entity 204 may depict physical entities' type such as a router, SD-WAN, and the like. Software version 206 may provide current software version being run on the physical entities. Configuration data 208 may depict configuration information of the physical entities. Availability of equivalent virtual entity 210 may depict information about availability of the equivalent virtual entities corresponding to the physical entities. Type of virtual entity 212 may depict the type of the virtual entities such as open virtualization format (OVF), open virtual appliance (OVA), and the like. In one example, availability of the equivalent virtual entities may be dynamically determined or manually entered. For example, based on the type of the virtual entities, the equivalent virtual entities may be dynamically determined by developing scripts. On the other hand, a user or administrator can provide the equivalent version of the virtual entity availability manually. Further, source of the virtual entity 214 may provide information regarding the source that provides the virtual entities. Status of high availability 216 may provide information whether high availability of the physical entities can be provided or not.

In one example, the administrator may have flexibility to exclude any specific physical entity that may not require redundancy from physical to virtual redundancy table 154. Also, when there is no equivalent or compatible virtual entity for the particular physical entity, the physical entity may be excluded from redundancy automatically. For example, as shown in third row of physical to virtual redundancy table 154, a physical entity 'arista router' may not have an equivalent virtual entity. Thus, the 'arista router' may be excluded from providing redundancy.

Example Processes

FIG. 3 is an example flow diagram 300 for providing redundancy between physical and virtual entities in a hyper-converged infrastructure. At 302, a physical entity with configuration data may be identified in a hyper-converged infrastructure as a primary entity. At 304, an equivalent virtual entity corresponding to the physical entity may be determined. At 306, the equivalent virtual entity may be deployed in a compute node (e.g., a virtual machine or server) of the hyper-converged infrastructure. At 308, the configuration data associated with the physical entity may be applied to the deployed equivalent virtual entity. At 310, the equivalent virtual entity may be designated as a fail-over entity to provide redundancy in an event of failure of the physical entity.

Figure 4:
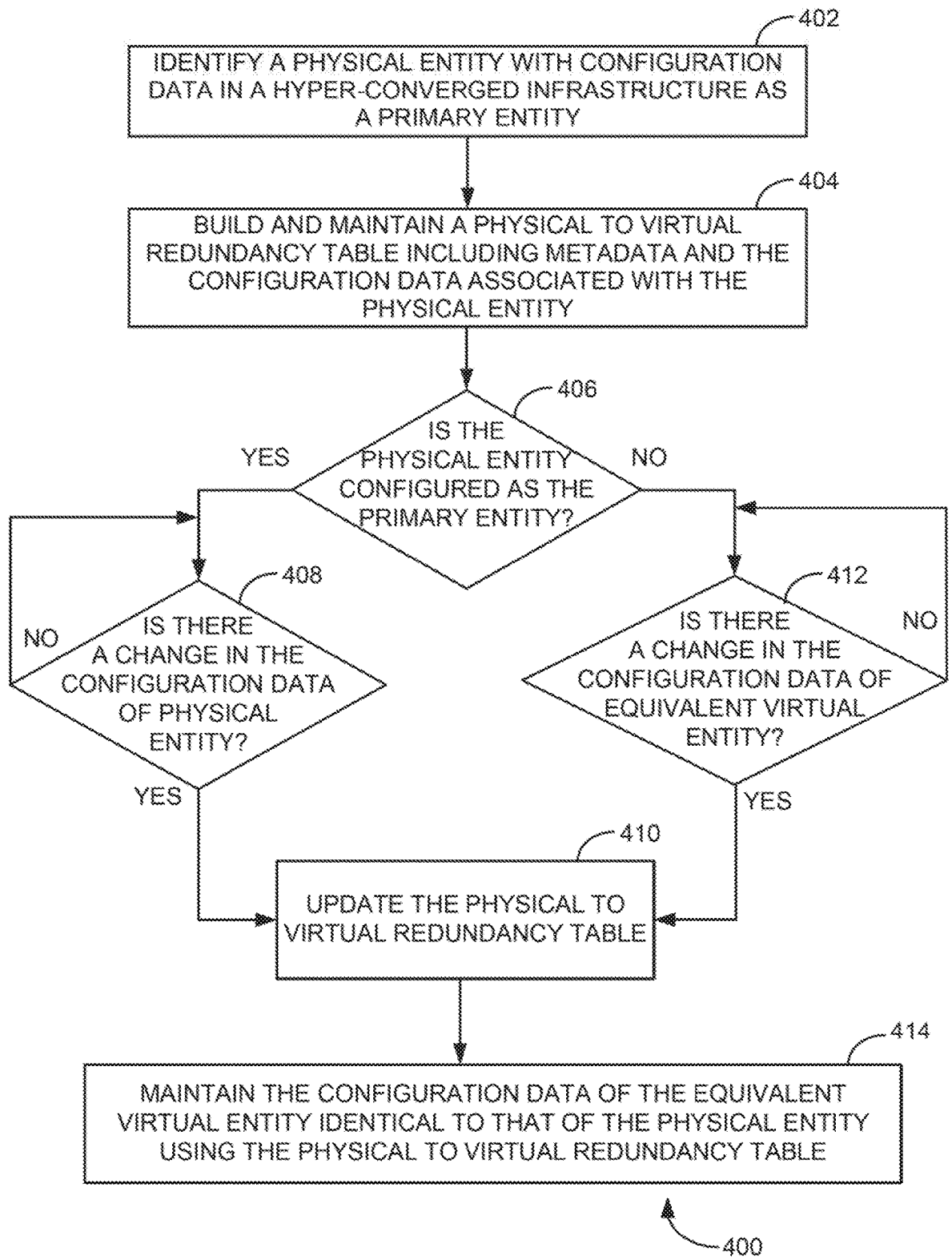
FIG. 4 is an example flow diagram illustrating dynamically updating a physical to virtual redundancy table based on a change in configuration data associated with a physical entity or an equivalent virtual entity.

FIG. 4 is an example flow diagram 400 for dynamically updating a physical to virtual redundancy table based on a change in configuration data associated with a physical entity or an equivalent virtual entity. At 402, the physical entity with the configuration data may be identified in a hyper-converged infrastructure as a primary entity. At 404, a physical to virtual redundancy table including metadata and the configuration data associated with the physical entity may be built and maintained.

At 406, a check may be made to determine whether the physical entity is the primary entity. At 408, when the physical entity is the primary entity, a check may be made to determine whether there is a change in the configuration data of the physical entity. When there is no change in the configuration data, the check may be continued. When there is a change in the configuration data, at 410, the physical to virtual redundancy table may be updated to reflect the change in the configuration data.

At 412, when the physical entity is not the primary entity, a check may be made to determine whether there is a change in the configuration data of an equivalent virtual entity of the physical entity. When there is no change in the configuration data, the check may be continued. Where there is a change in the configuration data, the physical to virtual redundancy table may be updated to reflect the change in the configuration data, at 410. At 414, the configuration data of the equivalent virtual entity may be maintained identical to that of the physical entity using the physical to virtual redundancy table.

Figure 5:
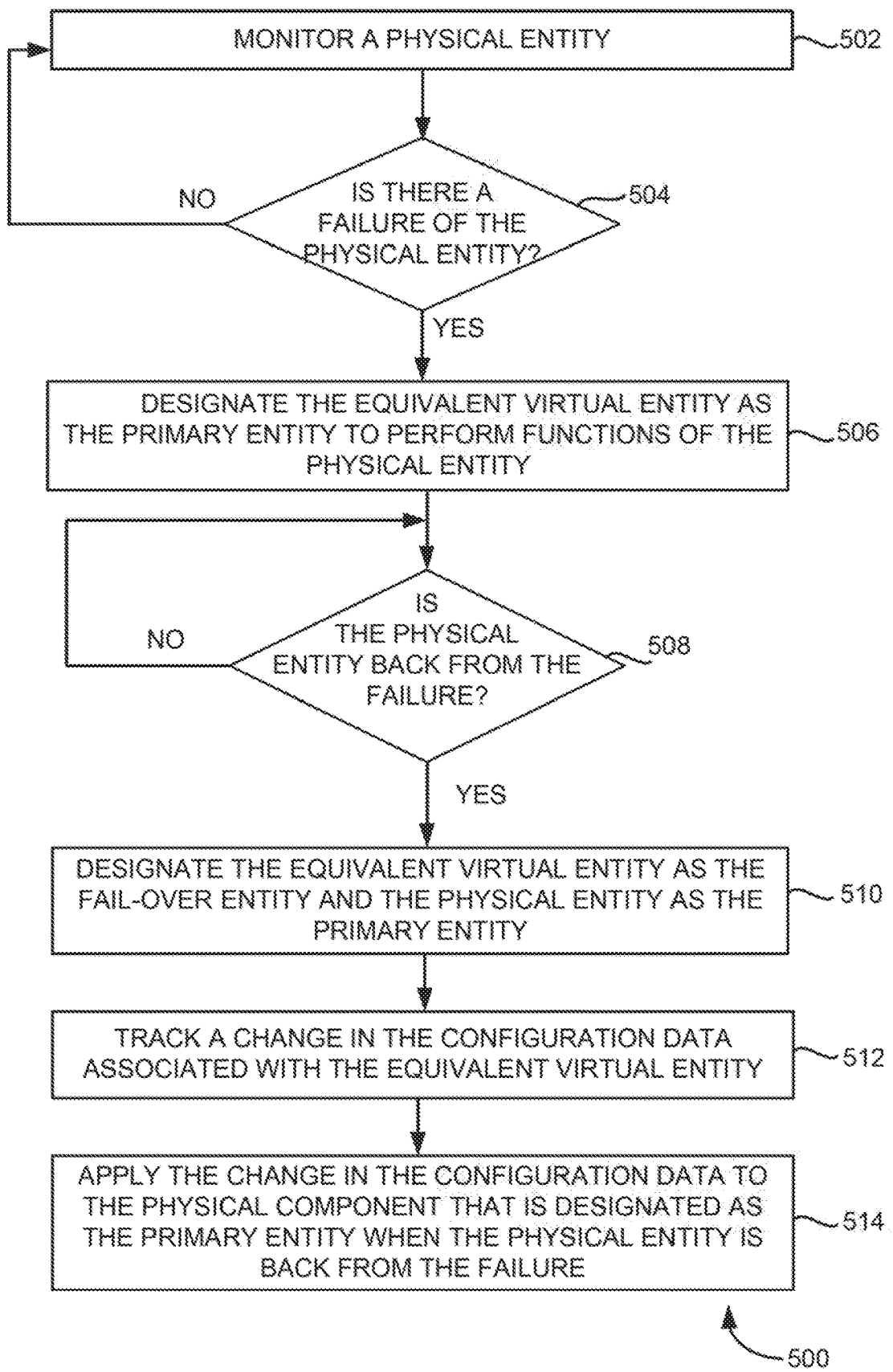
FIG. 5 is an example flow diagram illustrating designating an equivalent virtual entity as a primary entity to perform functions of a physical entity during an event of failure of the physical entity.

FIG. 5 is an example flow diagram 500 illustrating designating an equivalent virtual entity as a primary entity to perform functions of a physical entity during an event of failure of the physical entity. At 502, a physical entity may be monitored. In one example, the physical entity may be monitored by running a probing mechanism at defined intervals. At 504, a check is made to determine whether the physical entity is failed based on monitoring. When the physical entity is not failed, the process of monitoring the physical entity may be continued. At 506, an equivalent virtual entity may be designated as the primary entity to perform functions of the physical entity upon detecting the failure of the physical entity. In one example, the configuration data associated with the physical entity may be applied to the equivalent virtual entity using the physical to virtual redundancy table.

At 508, a check is made to determine whether the physical entity is back or recovered from the failure. When the physical entity is not recovered, the check to determine the status of the physical entity may be continued. At 510, when the physical entity is back from the failure, the equivalent virtual entity may be designated as the fail-over entity via isolating the equivalent virtual entity from a network and the physical entity may be designated as the primary entity. At 512, a change in the configuration data associated with the equivalent virtual entity when the equivalent virtual entity is designated as the primary entity may be tracked. At 514, the change in the configuration data may be applied to the physical entity that may be designated as the primary entity when the physical entity is back from the failure.

It should be understood that the processes depicted in FIGS. 3-5 may represent generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Figure 6:
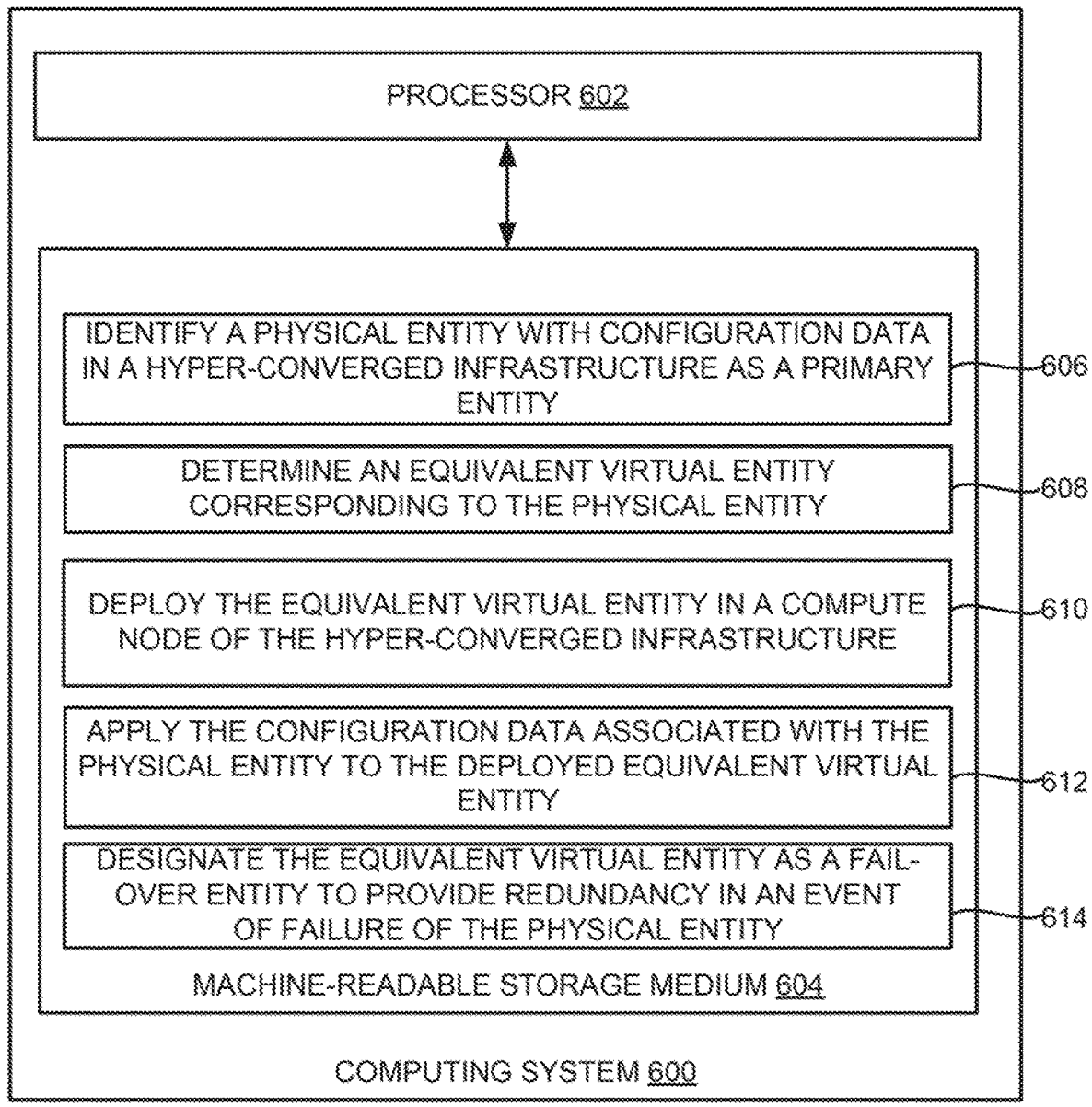
FIG. 6 is a block diagram of an example computing system including a non-transitory computer-readable storage medium, storing instructions to provide redundancy between physical and virtual entities in a hyper-converged infrastructure.

FIG. 6 is a block diagram of an example computing system 600 including a non-transitory computer-readable storage medium 604, storing instructions to provide redundancy between physical and virtual entities in a hyper-converged infrastructure. Computing system 600 may include a processor 602 and machine-readable storage medium 604 communicatively coupled through a system bus. Processor 602 may be any type of central processing unit (CPU), microprocessor, or processing logic that interprets and executes machine-readable instructions stored in the machine-readable storage medium 604. Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to computing system 600.

Machine-readable storage medium 604 may store instructions 606-614. In an example, instructions 606-614 may be executed by processor 602 to provide redundancy between the physical and virtual entities in the hyper-converged infrastructure. Instructions 606 may be executed by processor 602 to identify a physical entity with configuration data in the hyper-converged infrastructure as a primary entity. Instructions 608 may be executed by processor 602 to determine an equivalent virtual entity corresponding to the physical entity. Instructions 610 may be executed by processor 602 to deploy the equivalent virtual entity in a compute node of the hyper-converged infrastructure. Instructions 612 may be executed by processor 602 to apply the configuration data associated with the physical entity to the deployed equivalent virtual entity. Further, Instructions 614 may be executed by processor 602 to designate the equivalent virtual entity as a fail-over entity to provide redundancy in an event of failure of the physical entity.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A management node comprising:
   a processor; and
   a memory coupled to the processor, wherein the memory comprises a physical to virtual redundancy module to:
   identify a physical entity with configuration data in a hyper-converged infrastructure as a primary entity;
   determine an equivalent virtual entity corresponding to the physical entity;
   deploy the equivalent virtual entity in a compute node of the hyper-converged infrastructure;
   apply the configuration data associated with the physical entity to the deployed equivalent virtual entity; and
   designate the equivalent virtual entity as a fail-over entity to provide redundancy in an event of failure of the physical entity.

2. The management node of claim 1, wherein the physical to virtual redundancy module is to:
   detect a failure of the physical entity; and
   designate the equivalent virtual entity as the primary entity to perform functions of the physical entity upon detecting the failure of the physical entity.

3. The management node of claim 2, wherein the physical to virtual redundancy module is to:
   detect the failure of the physical entity by running a probing mechanism at defined intervals.

4. The management node of claim 2, wherein the physical to virtual redundancy module is to:
   detect that the physical entity is back from the failure; and
   when the physical entity is back from the failure, designate the equivalent virtual entity as the fail-over entity via isolating the equivalent virtual entity from a network and the physical entity as the primary entity.

5. The management node of claim 4, wherein the physical to virtual redundancy module is to:
   track a change in the configuration data associated with the equivalent virtual entity; and
   apply the change in the configuration data to the physical entity that is designated as the primary entity when the physical entity is back from the failure.

6. The management node of claim 1, wherein the physical to virtual redundancy module is to build a physical to virtual redundancy table including metadata and the configuration data associated with the physical entity upon identifying the physical entity.

7. The management node of claim 6, wherein the physical to virtual redundancy module is to:
   track a change in the configuration data associated with the physical entity or the equivalent virtual entity that is designated as the primary entity; and
   update the physical to virtual redundancy table to reflect the change in the configuration data.

8. The management node of claim 6, wherein the physical to virtual redundancy module is to:
   maintain the configuration data of the equivalent virtual entity identical to that of the physical entity using the physical to virtual redundancy table.

9. The management node of claim 1, wherein the physical to virtual redundancy module is to:
   perform synchronization of the configuration data, apply network connectivity configurations for the equivalent virtual entity, and/or image of the compute node via an out of band (OOB) management network.

10. The management node of claim 1, wherein the physical entity is a network device to route network traffic to the Internet and vice-versa in the hyper-converged infrastructure.

11. The management node of claim 1, wherein the physical entity and the compute node are implemented as part of a branch office of the hyper-converged infrastructure.

12. The management node of claim 1, wherein the physical to virtual redundancy module is to identify the physical entity upon receiving a request to create physical to virtual redundancy for the physical entity.

13. A method comprising:
   identifying a physical entity with configuration data in a hyper-converged infrastructure as a primary entity;
   determining an equivalent virtual entity corresponding to the physical entity;
   deploying the equivalent virtual entity in a compute node of the hyper-converged infrastructure;
   applying the configuration data associated with the physical entity to the deployed equivalent virtual entity; and
   designating the equivalent virtual entity as a fail-over entity to provide redundancy in an event of failure of the physical entity.

14. The method of claim 13, further comprising:
   detecting a failure of the physical entity; and
   designating the equivalent virtual entity as the primary entity to perform functions of the physical entity upon detecting the failure of the physical entity.

15. The method of claim 14, wherein detecting the failure of the physical entity comprises running a probing mechanism at defined intervals.

16. The method of claim 14, further comprising:
   detecting that the physical entity is back from the failure; and
   when the physical entity is back from the failure, designating the equivalent virtual entity as the fail-over entity via isolating the equivalent virtual entity from a network and the physical entity as the primary entity.

17. The method of claim 16, further comprising:
   tracking a change in the configuration data associated with the equivalent virtual entity; and
   applying the change in the configuration data to the physical entity that is designated as the primary entity when the physical entity is back from the failure.

18. The method of claim 13, further comprising:
   building a physical to virtual redundancy table including metadata and the configuration data associated with the physical entity upon identifying the physical entity.

19. The method of claim 18, further comprising:
   tracking a change in the configuration data associated with the physical entity or the equivalent virtual entity that is designated as the primary entity; and
   updating the physical to virtual redundancy table to reflect the change in the configuration data.

20. A non-transitory computer readable storage medium having instructions that when executed by a processor, cause the processor to:
   identify a physical entity with configuration data in a hyper-converged infrastructure as a primary entity;
   determine an equivalent virtual entity corresponding to the physical entity;
   deploy the equivalent virtual entity in a compute node of the hyper-converged infrastructure;
   apply the configuration data associated with the physical entity to the deployed equivalent virtual entity; and
   designate the equivalent virtual entity as a fail-over entity to provide redundancy in an event of failure of the physical entity.

21. The non-transitory computer readable storage medium of claim 20, further comprising instructions that when executed by the processor, cause the processor to:
   detect a failure of the physical entity; and
   designate the equivalent virtual entity as the primary entity to perform functions of the physical entity upon detecting the failure of the physical entity.

22. The non-transitory computer readable storage medium of claim 21, wherein instructions to detect the failure of the physical entity comprises instructions to run a probing mechanism at defined intervals.

23. The non-transitory computer readable storage medium of claim 21, further comprising instructions that when executed by the processor, cause the processor to:
   detect that the physical entity is back from the failure; and
   when the physical entity is back from the failure, designate the equivalent virtual entity as the fail-over entity via isolating the equivalent virtual entity from a network and the physical entity as the primary entity.

24. The non-transitory computer readable storage medium of claim 23, further comprising instructions that when executed by the processor, cause the processor to:
   track a change in the configuration data associated with the equivalent virtual entity; and
   apply the change in the configuration data to the physical entity that is designated as the primary entity when the physical entity is back from the failure.

25. The non-transitory computer readable storage medium of claim 20, further comprising instructions that when executed by the processor, cause the processor to:
   build a physical to virtual redundancy table including metadata and the configuration data associated with the physical entity upon identifying the physical entity.

26. The non-transitory computer readable storage medium of claim 25, further comprising instructions that when executed by the processor, cause the processor to:
- track a change in the configuration data associated with the physical entity or the equivalent virtual entity that is designated as the primary entity; and
- update the physical to virtual redundancy table to reflect the change in the configuration data.

* * * * *